A. CROOK AND R. D. CHAPMAN.
METHOD AND MEANS FOR MAKING ASBESTOS SHINGLES.
APPLICATION FILED APR. 11, 1919.
1,352,941.                                             Patented Sept. 14, 1920.
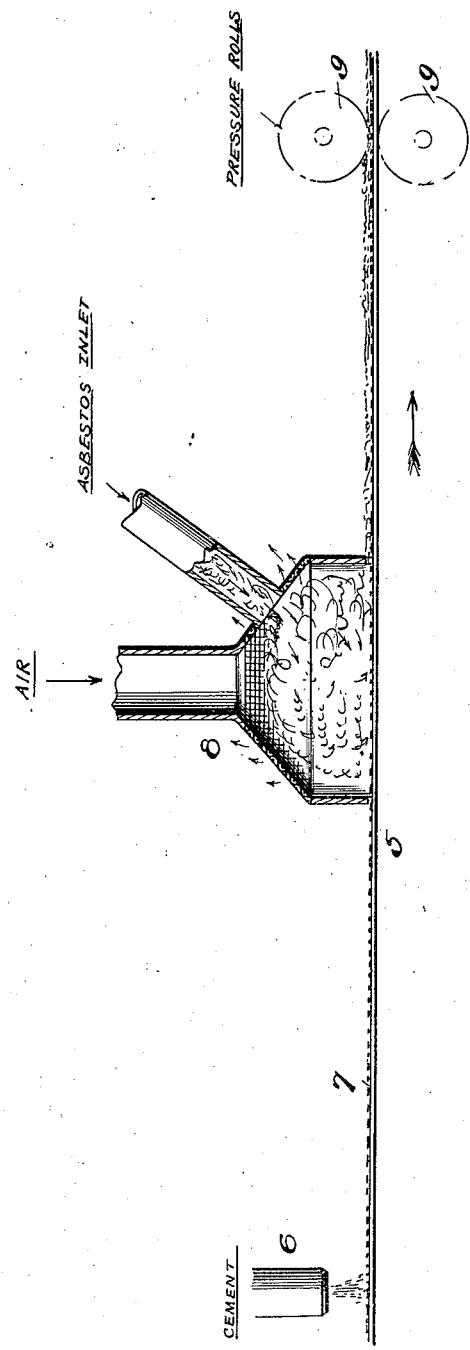
Inventors
Alfred Crook.
Richard D. Chapman.
by Jas. P. Richmond
Attorney.

UNITED STATES PATENT OFFICE.

ALFRED CROOK AND RICHARD D. CHAPMAN, OF PHILADELPHIA, PENNSYLVANIA, ASSIGNORS TO TAYLOR-WHARTON IRON AND STEEL COMPANY, OF HIGH BRIDGE, NEW JERSEY, A CORPORATION OF NEW JERSEY.

METHOD AND MEANS FOR MAKING ASBESTOS SHINGLES.

1,352,941.      Specification of Letters Patent.      Patented Sept. 14, 1920.

Application filed April 11, 1919. Serial No. 289,347.

*To all whom it may concern:*

Be it known that we, ALFRED CROOK and RICHARD D. CHAPMAN, citizens of the United States, residing at Philadelphia, in the county of Philadelphia and State of Pennsylvania, have invented certain new and useful Improvements in Methods and Means for Making Asbestos Shingles, of which the following is a specification.

The principal object of the present invention is to provide a method and means for rapidly and economically making artificial stone or plaster board for ultimate use as roofing material, wall and ceiling panels, and the like.

Generally stated, the improved method comprises the following steps, to wit: (1) forming a core or matrix, such as a layer or strata of wet cementitious material; (2) applying unbalanced supplies of asbestos to the surface of the layer; and (3) incorporating and compacting the superposed materials, wet cement and asbestos, by subjecting them to the action of suitable pressure provisions.

The accompanying drawing forming a part hereof illustrates diagrammatically suitable means for carrying the invention into practice.

Referring to the drawing, the numeral 5 designates a suitable carrier in the form of an endless belt or apron. 6 indicates a device, for example a cement gun, for establishing a layer 7 of plastic cementitious material, which may be hydraulic cement with enough water to give it the necessary fluid or plastic consistency. The carrier conveys the plastic core or matrix 7 beneath a housing 8, which receives asbestos material and air under pressure. The cyclonic effect induced by the blast of air keeps the asbestos in constant whirling motion so that only variable supplies of it adhere to the exposed wet cement surface. The superposed materials are thoroughly incorporated by subjecting them to the action of suitable pressure provision 9. The pressed material is then cut to the size and shape desired. In some cases a pigment is added to the cementitious material before forming the substantially flat core or matrix 7. After being acted upon by the pressure rolls, the material is stripped from the carrier in any suitable manner.

Having described the nature and object of our invention, we claim:—

1. The method herein-described, which consists in preparing a substantially flat core or matrix of wet cementitious material, establishing a localized air blast, feeding floccy asbestos material in the presence of said blast, whereby some of it is caused to adhere to said matrix, and then incorporating said materials by subjecting them to exerted pressure.

2. The method herein-described, which consists in exposing a surface of wet cementitious material to a whirling mass of asbestos, and then subjecting it to exerted pressure.

3. The method herein-described, which consists in exposing a mobile surface of wet cementitious material to a whirling mass of asbestos, and then subjecting it to exerted pressure.

4. The method herein-described, which consists in preparing a substantially flat core or matrix of wet cementitious material, exposing the same to the action of a localized air blast in the presence of divided asbestos, whereby some of the latter is caused to adhere to the surface of the core or matrix, and then incorporating said materials by subjecting them to exerted pressure.

5. Apparatus for the purpose stated, comprising the combination of means for establishing a substantially flat core or matrix of wet cementitious material, means for establishing a localized air blast in proximity therewith, means for delivering asbestos in the presence of said blast, whereby, some of it is caused to adhere to the matrix, and means for incorporating and compacting the cement and asbestos.

In testimony whereof we affix our signature.

ALFRED CROOK.
RICHARD D. CHAPMAN.